United States Patent
Abraham et al.

(10) Patent No.: US 7,640,103 B2
(45) Date of Patent: Dec. 29, 2009

(54) MULTI-FUNCTION APPLIANCE FOR A SATELLITE NAVIGATION DATA DISTRIBUTION SYSTEM

(75) Inventors: Charles Abraham, Los Gatos, CA (US); Steven Malkos, San Jose, CA (US); Sergei Podshivalov, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/206,615

(22) Filed: Aug. 18, 2005

(65) Prior Publication Data
US 2005/0288861 A1   Dec. 29, 2005

Related U.S. Application Data

(63) Continuation-in-part of application No. 10/719,890, filed on Nov. 21, 2003.

(51) Int. Cl.
*G01C 21/28* (2006.01)
(52) U.S. Cl. ........................ 701/213; 701/215; 701/214; 342/357.09; 342/357.12; 342/357.15
(58) Field of Classification Search ................. 701/213, 701/29, 215, 214; 340/435; 342/357.09, 342/357.12, 357.15, 357.1; 370/316
See application file for complete search history.

(56) References Cited

U.S. PATENT DOCUMENTS

| | | | |
|---|---|---|---|
| 4,445,118 A | 4/1984 | Taylor et al. | |
| 5,899,957 A | 5/1999 | Loomis | |
| 6,091,959 A | 7/2000 | Souissi et al. | |
| 6,185,427 B1 | 2/2001 | Krasner et al. | |
| 6,215,441 B1 * | 4/2001 | Moeglein et al. | 342/357.01 |
| 6,725,159 B2 | 4/2004 | Krasner | |
| 6,799,116 B2 | 9/2004 | Robbins | |
| 6,813,560 B2 * | 11/2004 | van Diggelen et al. | 701/213 |
| 6,985,454 B1 * | 1/2006 | Wiedeman et al. | 370/316 |
| 2002/0016674 A1 * | 2/2002 | Rudow et al. | 701/215 |
| 2002/0024461 A1 * | 2/2002 | Moeglein et al. | 342/357.1 |
| 2002/0032526 A1 | 3/2002 | van Diggelen | |

(Continued)

OTHER PUBLICATIONS

"International Search Report, PCT/US2004/039367" pp. 1-4.

(Continued)

*Primary Examiner*—Khoi H. Tran
*Assistant Examiner*—Ronnie Mancho
(74) *Attorney, Agent, or Firm*—McAndrews, Held & Malloy, Ltd.

(57) ABSTRACT

A multi-function appliance for use in a satellite navigation data distribution system is described. A computer includes an input/output interface and a memory the computer is configured with a plurality of modules. The plurality of modules includes a satellite signal receiver, a packetizer, a network interface, a concentrator, and a decoder. The satellite signal receiver is configured to obtain satellite navigation data from satellite signals. The packetizer is configured to packetize satellite navigation data to produce a reference packet stream. The network interface is configured to transmit packet streams towards a network. The concentrator is configured to remove duplicate packets within reference packet streams to generate a combined packet stream. The decoder is configured to decode satellite data from packet streams. In this manner, the computer may be configured to perform a reference station function, a hub function, or a server function in the satellite navigation data distribution network.

15 Claims, 7 Drawing Sheets

U.S. PATENT DOCUMENTS

| | | |
|---|---|---|
| 2002/0049536 A1 | 4/2002 | Gaal |
| 2002/0072855 A1* | 6/2002 | Fuchs et al. ................ 701/213 |
| 2002/0105459 A1 | 8/2002 | van Diggelen |
| 2002/0198657 A1 | 12/2002 | Robbins |
| 2003/0014188 A1* | 1/2003 | Abraham et al. ............ 701/213 |
| 2003/0107513 A1* | 6/2003 | Abraham et al. ......... 342/357.1 |
| 2003/0212821 A1 | 11/2003 | Gillies et al. |
| 2003/0223422 A1 | 12/2003 | Igarashi et al. |
| 2004/0049326 A1* | 3/2004 | Diggelen et al. .............. 701/13 |
| 2007/0103365 A1* | 5/2007 | Pande et al. ............ 342/357.15 |

OTHER PUBLICATIONS

"Written Opinion of the International Search Authority, PCT/US2004/039367," pp. 1-5.

Diggelen, *Global Locate Indoor GPS Chipset & Services*, ION GPS 2001, Sep. 11-14, 2001, Salt Lake City, UT, USA, 'Online! Sep. 11, 2001, pp. 1515-1521.

\* cited by examiner

MULTI-FUNCTION APPLIANCE FOR A SATELLITE NAVIGATION DATA DISTRIBUTION SYSTEM

CROSS-REFERENCE TO RELATED APPLICATIONS

This application is a continuation-in-part of co-pending U.S. patent application Ser. No. 10/719,890, filed Nov. 21, 2003, which is hereby incorporated by reference.

BACKGROUND OF THE INVENTION

1. Field of the Invention

The present invention generally relates to satellite position location systems and, more particularly, to a multi-function appliance for a satellite navigation data distribution system.

2. Description of the Related Art

A satellite signal receiver for the Global Positioning System (GPS) uses measurements from several satellites to compute a position. The process of acquiring the GPS radio signal is enhanced in speed and sensitivity if the GPS receiver has prior access to a model of the satellite orbit and clock. This model is broadcast by the GPS satellites and is known as the satellite navigation message. Once the GPS radio signal has been acquired, the process of computing position requires the use of information contained within the satellite navigation message.

The GPS satellite navigation message is transmitted in 1500-bit frames at 50 bits per second, as defined by ICD-GPS-200C. Thus, each frame is transmitted in 30 seconds. The 1500-bit frame of each broadcast includes five sub-frames of 300 bits length. The first three sub-frames (i.e., the first 900 bits) include the ephemeris information associated with the particular broadcasting satellite. The ephemeris information contains precise satellite orbit and time model information for a particular satellite. The first three sub-frames are identically repeated in each 1500-bit frame for a particular duration. The broadcast ephemeris information is typically valid for two to four hours into the future (from the time of broadcast) and is periodically updated by a satellite control station. The fourth and fifth sub-frames contain part of a satellite almanac, which includes coarse ephemeris and time model information for the entire satellite constellation. The contents of the fourth and fifth sub-frames change until the entire almanac is transmitted. The repetition period of the fourth and fifth sub-frames is 12.5 minutes (i.e., the entire satellite almanac is contained in 15,000 bits).

It is always slow (no faster than 18 seconds), frequently difficult, and sometimes impossible (in environments with very low signal strengths), for a GPS receiver to download ephemeris information from a satellite. For these reasons, it has long been known that it is advantageous to send the ephemeris to a GPS receiver by some other means in lieu of awaiting the transmission from the satellite. U.S. Pat. No. 4,445,118, issued Apr. 24, 1984, describes a technique that collects ephemeris information at a GPS reference station, and transmits aiding data to the remote GPS receiver via a wireless transmission. This technique of providing aiding data to a GPS receiver has become known as "Assisted-GPS".

Presently, A-GPS reference stations receive ephemeris data for in-view satellites and store the entire ephemeris model (e.g., 900 bits) as a data file for distribution. The data file containing the ephemeris is transmitted to the remote receiver at some time after the initial collection of the data (e.g., minutes later). This latency between collection and distribution of the ephemeris data may deleteriously affect operation of the remote receiver. For example, the ephemeris data in use by the remote receiver may become invalid due to an unhealthy satellite. The remote receiver, however, will continue to use the invalid ephemeris data for several minutes before receiving updated ephemeris data from the server.

Therefore, there exists a need in the art for a method and apparatus that distributes satellite navigation data to a remote receiver with decreased latency.

SUMMARY OF THE INVENTION

The disadvantages associated with the prior art are overcome by a method and apparatus for distributing satellite navigation data. In one embodiment, satellite signals are processed at each of a plurality of reference stations to receive a respective plurality of satellite navigation data streams. Packets are formed in response to said plurality of satellite navigation data streams to generate a plurality of packetized satellite navigation data streams. The packetized satellite navigation data streams are sent to a processing system. The processing system removes duplicate packets within said plurality of packetized satellite navigation data streams to generate a combined packet stream. The combined packet stream is then sent into a communication network.

In another embodiment, a multi-function appliance for use in a satellite navigation data distribution system is described. A computer includes an input/output interface and a memory. The computer is configured with a plurality of modules. The plurality of modules includes a satellite signal receiver, a packetizer, a network interface, a concentrator, and a decoder. The satellite signal receiver is configured to obtain satellite navigation data from satellite signals. The packetizer is configured to packetize satellite navigation data to produce a reference packet stream. The network interface is configured to transmit packet streams towards a network. The concentrator is configured to remove duplicate packets within reference packet streams to generate a combined packet stream. The decoder is configured to decode satellite data from packet streams. In this manner, the computer may be configured to perform a reference station function, a hub function, or a server function in the satellite navigation data distribution network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Figure 1:
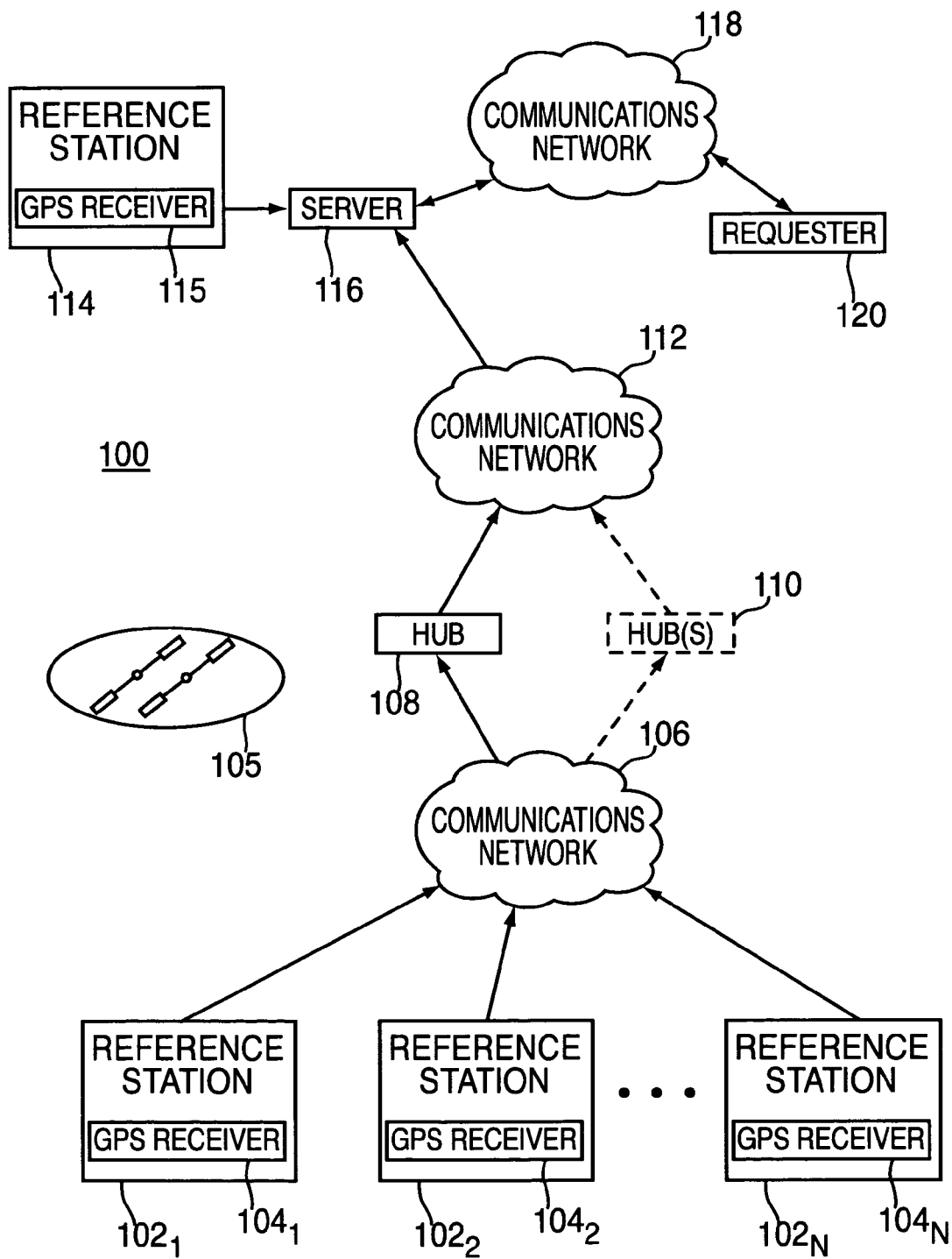
FIG. 1 is a block diagram depicting an exemplary embodiment of a satellite navigation data distribution system.

FIG. 1 is a block diagram depicting an exemplary embodiment of a satellite navigation data distribution system 100. The system 100 comprises a plurality of reference stations $102_1$ through $102_N$ (collectively referred to as reference stations 102), a hub 108, and a server 116. The reference stations 102 receive satellite navigation data from a plurality of satellites 105. The hub 108 collects the satellite navigation data from the reference stations 102 and provides the satellite navigation data to the server 116. The server 116 processes the satellite navigation data to decode the various parameters defined therein. The server 116 may then transmit information extracted from the satellite navigation data to a requester 120.

More specifically, each of the reference stations $102_1$ through $102_N$ includes a respective one of GPS receivers $104_1$ through $104_N$ (collectively referred to as satellite signal receivers 104) for receiving signals from satellites of the plurality of satellites 105 that are in-view. Each of the GPS receivers 104 decodes the received satellite signals to obtain satellite navigation data associated with the in-view satellites. The satellite navigation data comprises satellite navigation messages that are formatted into frames and sub-frames, as described above. The GPS receivers 104 are capable of streaming raw satellite navigation messages in real time. For example, certain NovAtel GPS receivers have this capability.

The reference stations 102 format the satellite navigation data streams produced by the GPS receivers 104 for transmission over the communications network 106 to the hub 108. In one embodiment, the reference stations 102 process the data streams to form packet streams comprising internet protocol (IP) packets, which may be transmitted over the communication link 106 using the uniform datagram protocol (UDP). The hub 108 processes the formatted data streams from the reference stations 102 ("reference station data streams") to remove redundant information. The hub 108 produces a formatted data stream comprising the unique information from the reference station data streams satellite navigation data from the reference stations 102 ("hub data stream"). The hub 108 transmits the hub data stream to the server 116 using a communication network 112. In one embodiment of the invention, one or more additional hubs ("hub(s) 110") are used to provide redundancy. The hub(s) 110 operate in the same manner as the hub 108. Each of the communication networks 106 and 112 may comprise any type of network known in the art, such frame relay, asynchronous transfer mode (ATM) networks, and the like. Although the communication networks 106 and 112 have been shown as separate networks, those skilled in the art will appreciate that networks 106 and 112 may comprise a single network.

In one embodiment, another reference station 114 may be disposed in proximity to the server 116. The reference station 114 includes a GPS receiver 115 similar to the GPS receivers 104, and provides a formatted data stream similar to those provided by the reference stations 102 ("co-located reference station data stream"). The server 116 processes the hub data stream(s) and the co-located reference station data stream, if available, to extract various parameters therefrom. For example, the server 116 may extract one or more of ephemeris data, almanac data, ionosphere data, universal time (UTC) offset data, satellite health data, as well as the raw data bits comprising the satellite navigation messages. Similar to the hubs 108 and 110, the server 116 may first process the hub data stream(s) and the co-located reference station data streams to remove redundant information. The extracted information may be provided to the requester 120 using a communication network 118. The communication network 118 may comprise a wireless communication network or other type of communication network, such as the Internet.

Figure 2:
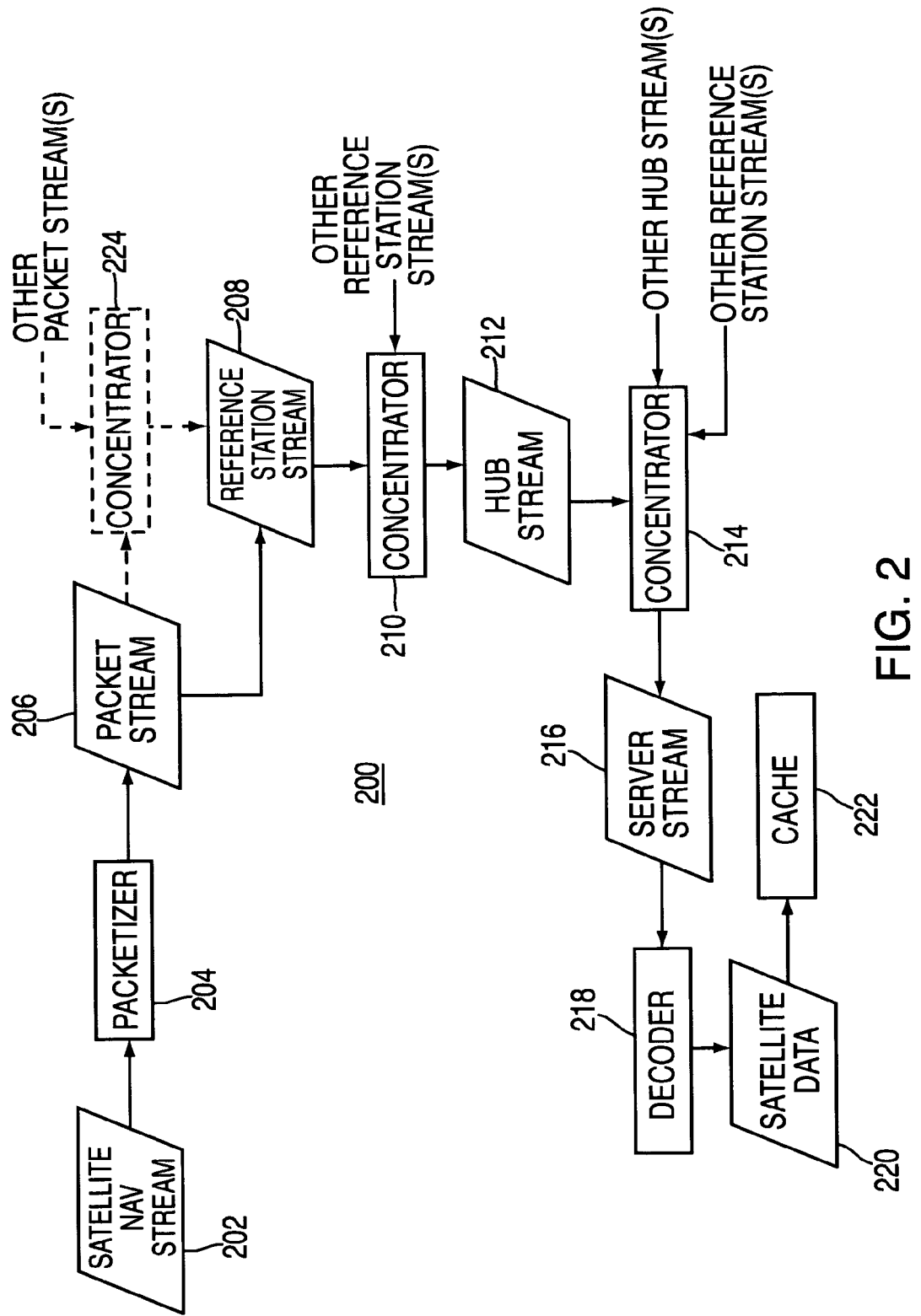
FIG. 2 is a data flow diagram depicting an exemplary embodiment of a process for distributing satellite navigation data from a reference station to a server.

FIG. 2 is a data flow diagram depicting an exemplary embodiment of a process 200 for distributing satellite navigation data from a reference station to a server. The process 200 begins with a satellite navigation data stream 202. The satellite navigation data stream 202 comprises sub-frames of satellite navigation messages broadcast by in-view satellites. The satellite navigation data stream 202 is provided as input to a packetizer 204. The packetizer 204 formats the satellite navigation data stream 202 into a packet stream 206. In one embodiment of the invention, each packet in the packet stream 206 includes a sub-frame of the satellite navigation data stream 202. In addition, each packet in the packet stream 206 includes a header for identifying the sub-frame carried therein. For example, the header may include a satellite identifier and a time-of-week (TOW) value that uniquely identifies the associated sub-frame. The packet stream 206 may be directly output as a reference station data stream 208.

The reference station data stream 208 is provided as input to a concentrator 210. The concentrator 210 also receives reference station data streams from other reference stations. The concentrator 210 processes the reference station data streams to remove packets carrying redundant information. For example, two of the reference stations may be positioned on the surface of the Earth so as to receive the satellite navigation message from the same satellite. The reference station data streams corresponding to these two reference stations will include packets that define identical sub-frames. The redundant sub-frame is not necessary and may be removed. The concentrator 210 provides a hub data stream 212 as output. The hub data stream 212 comprises a packet stream having unique information from the reference stations. For example, the hub data stream 212 may comprise a stream of packets carrying unique sub-frames.

The hub data stream 212 is provided as input to a concentrator 214. The concentrator 214 may also receive additional hub data stream(s), as well as an additional reference station data stream from a reference station co-located with the server. The concentrator 214 operates in a similar manner to the concentrator 210 to generate a server data stream 216. The server data stream 216 comprises a packet stream having unique information from the hubs and the co-located reference station. The server data stream 216 is provided as input to a decoder 218. The decoder 218 processes the server data stream 216 to extract satellite data 220. The satellite data 220 comprises one or more of ephemeris, almanac, ionosphere data, UTC offset, satellite health status, and raw data bits. The satellite data 220 is stored within a cache 222.

In one embodiment of the invention, a reference station may receive a reference station data stream from another reference station. Thus, the packet stream 206 within the reference station may be provided as input to an optional concentrator 224. The concentrator 224 operations in a similar manner to the concentrators 210 and 214 to remove redundant information and provide a unique reference station data stream 208 to the hub.

Figure 3:
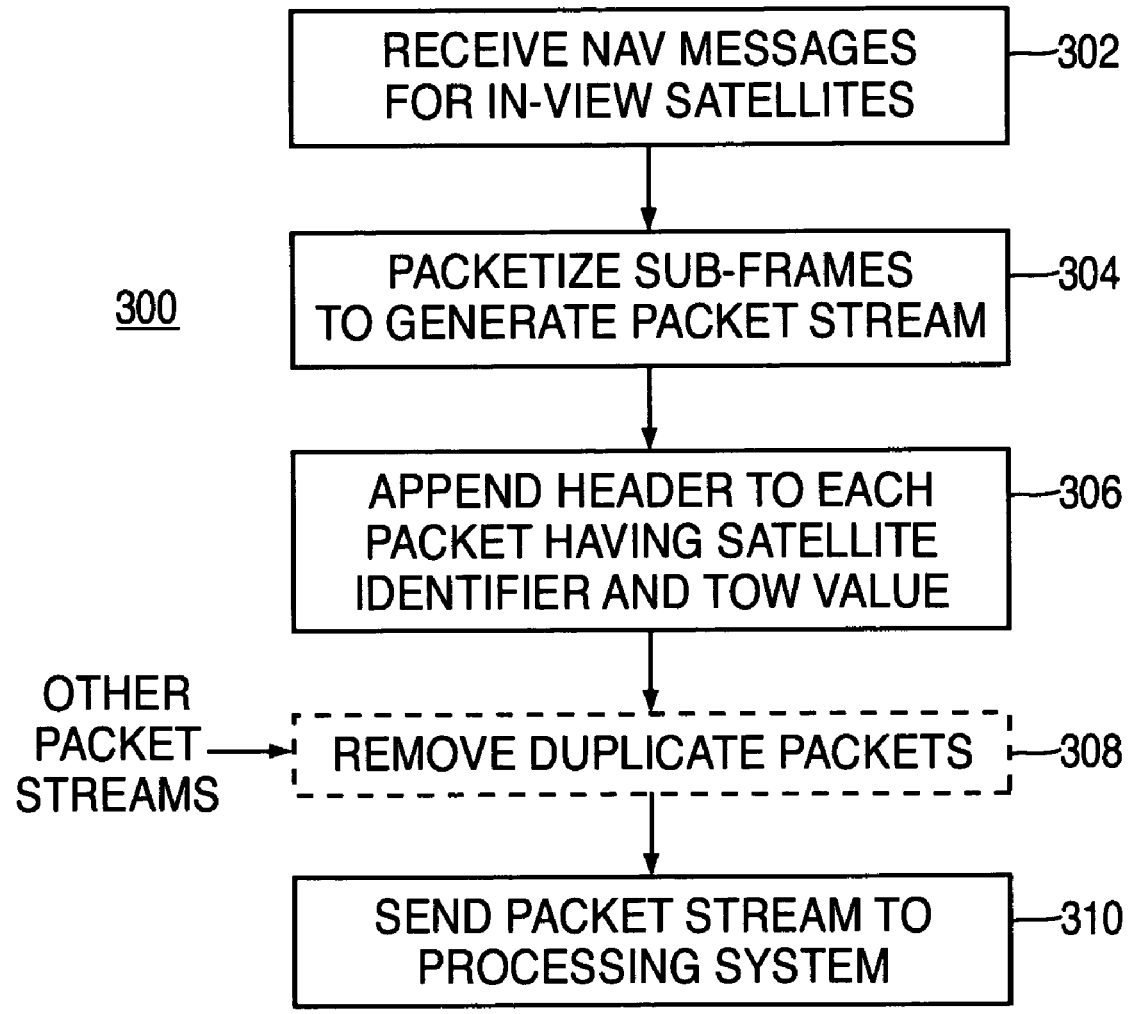
FIG. 3 is a flow diagram depicting an exemplary embodiment of a process for decoding satellite signals to recover satellite navigation data within a reference station.

FIG. 3 is a flow diagram depicting an exemplary embodiment of a process 300 for decoding satellite signals to recover satellite navigation data within a reference station. The process 300 begins at step 302, where satellite navigation messages are received for a plurality of in-view satellites. At step 304, the sub-frames of the satellite navigation messages are packetized to generate a packet stream (e.g., a stream of IP packets). At step 306, a header is added to each packet within the packet stream having a satellite identifier and a TOW value associated with a respective sub-frame. At optional step 308, the packet stream is merged with packet stream(s) from other reference stations and packets carrying redundant sub-frames are removed (e.g., packets having a header with the same satellite identifier and same TOW value). At step 310, the packet stream is transmitted to a hub. For example, the packet stream may be transmitted using UDP.

Figure 4:
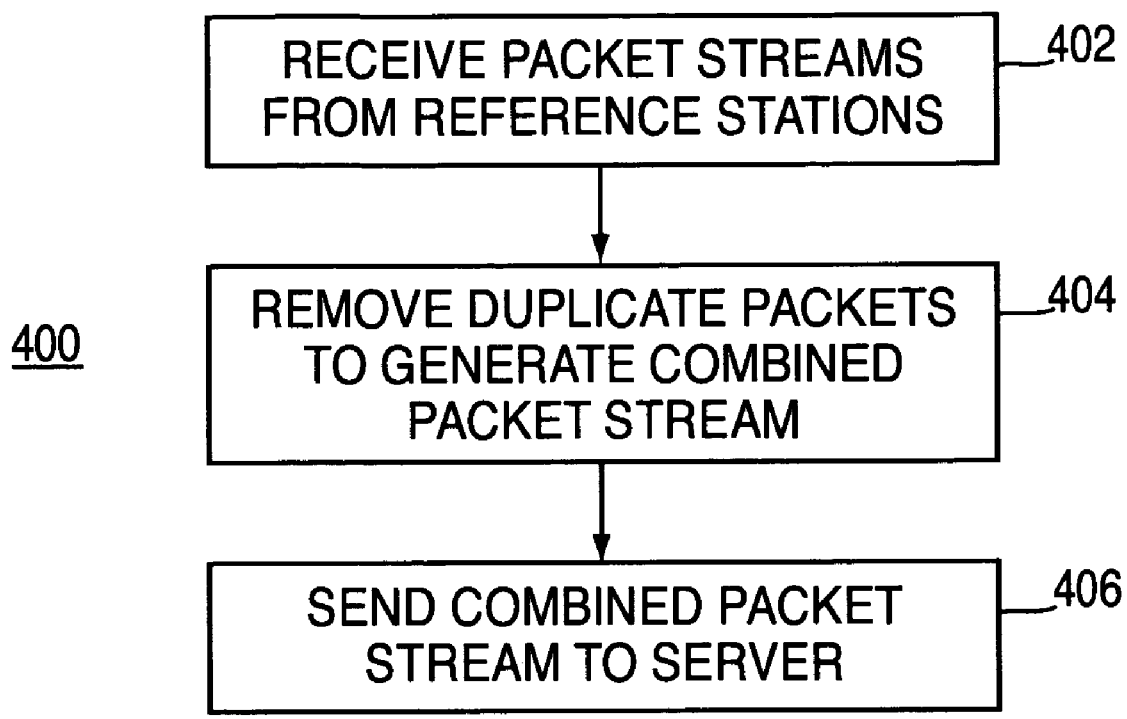
FIG. 4 is a flow diagram depicting an exemplary embodiment of a process for concentrating satellite navigation data within a hub.

FIG. 4 is a flow diagram depicting an exemplary embodiment of a process 400 for concentrating satellite navigation data within a hub. The process 400 begins at step 402, where packet streams are received from a plurality of reference stations. At step 404, packets of the packet streams are analyzed to remove those packets carrying redundant information and merged to produce a hub packet stream. For example, the headers of the packets may be analyzed for identify those headers having the same satellite identifier and the same TOW value. At step 406, the hub packet stream is transmitted to a server. For example, the hub packet stream may be transmitted using UDP.

Figure 5:
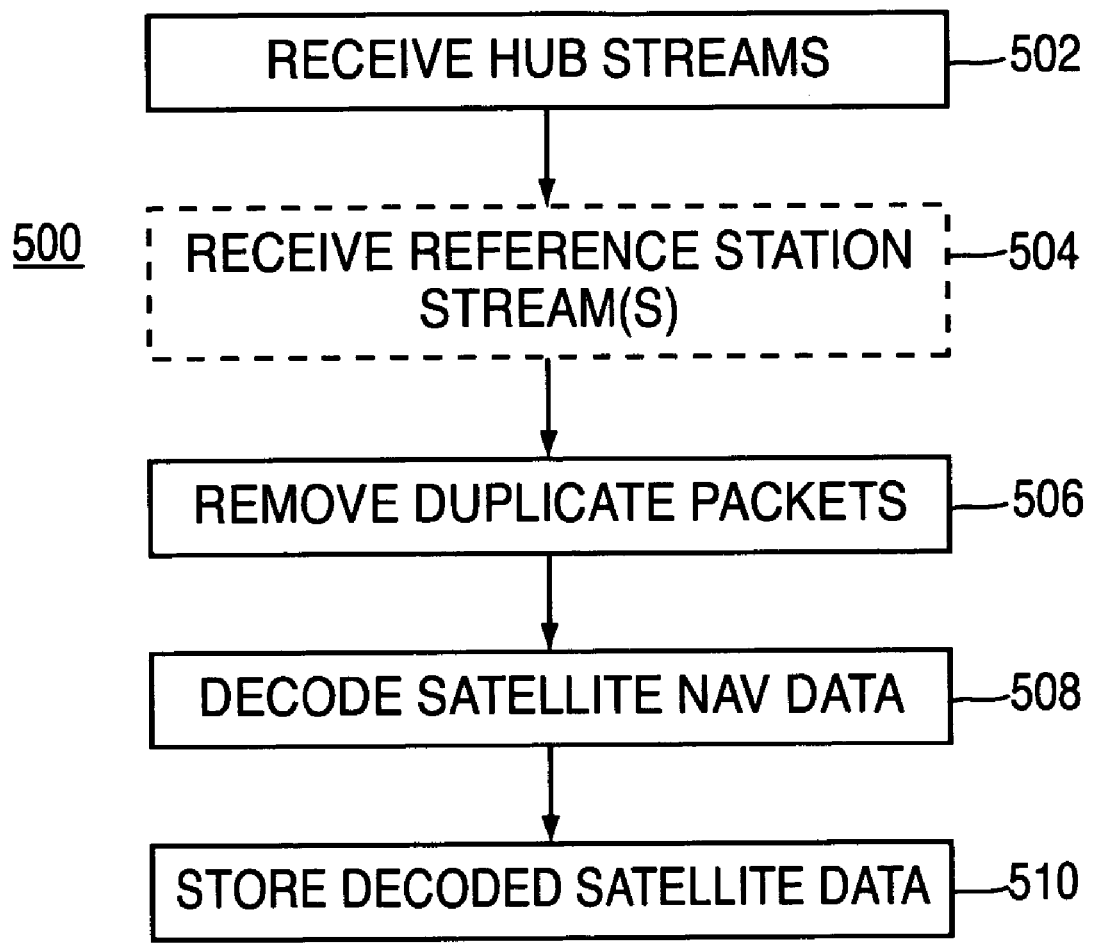
FIG. 5 is a flow diagram depicting an exemplary embodiment of a process for decoding satellite navigation data at a server.

FIG. 5 is a flow diagram depicting an exemplary embodiment of a process 500 for decoding satellite navigation data at a server. The process 500 begins at step 502, where one or more hub data stream(s) are received from one or more hubs. At optional step 504, a reference station data stream is received from a reference station co-located with the server. At step 506, packets of the hub data stream(s) and the optional reference station data are merged to produce a server data stream and packets carrying redundant sub-frames are removed (e.g., packets having a header with the same satellite identifier and same TOW value). At step 508, the satellite navigation data carried by the server data stream is decoded to produce satellite data. At step 510, the satellite data is stored within the server for transmission to a requester.

Figure 6:
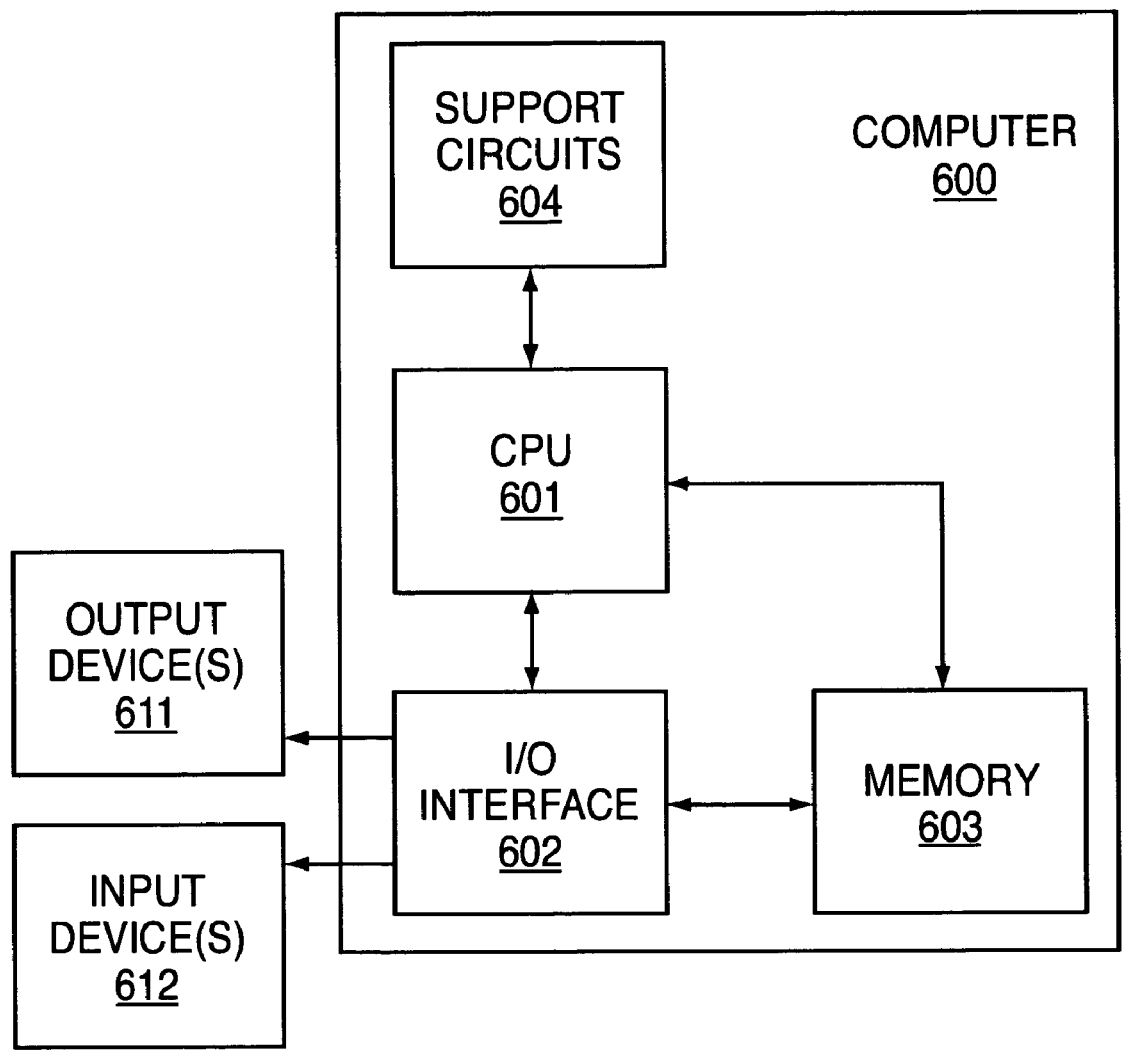
FIG. 6 is a block diagram depicting an exemplary embodiment of a computer for implementing the processes and methods described herein.

FIG. 6 is a block diagram depicting an exemplary embodiment of a computer 600 suitable for implementing processes and methods described above. The computer 600 includes a central processing unit (CPU) 601, a memory 603, various support circuits 604, and an I/O interface 602. The CPU 601 may be any type of microprocessor known in the art. The support circuits 604 for CPU 602 include conventional cache, power supplies, clock circuits, data registers, I/O interfaces, and the like. The I/O interface 602 may be directly coupled to the memory 603 or coupled through the CPU 601. The I/O interface 602 may be coupled to various input devices 612 and output devices 611, such as a conventional keyboard, mouse, printer, display, and the like.

The memory 603 may store all or portions of one or more programs and/or data to implement the processes and methods described above. Although the invention is disclosed as being implemented as a computer executing a software program, those skilled in the art will appreciate that the invention may be implemented in hardware, software, or a combination of hardware and software. Such implementations may include a number of processors independently executing various programs and dedicated hardware, such as application specific integrated circuits (ASICs).

Figure 7:
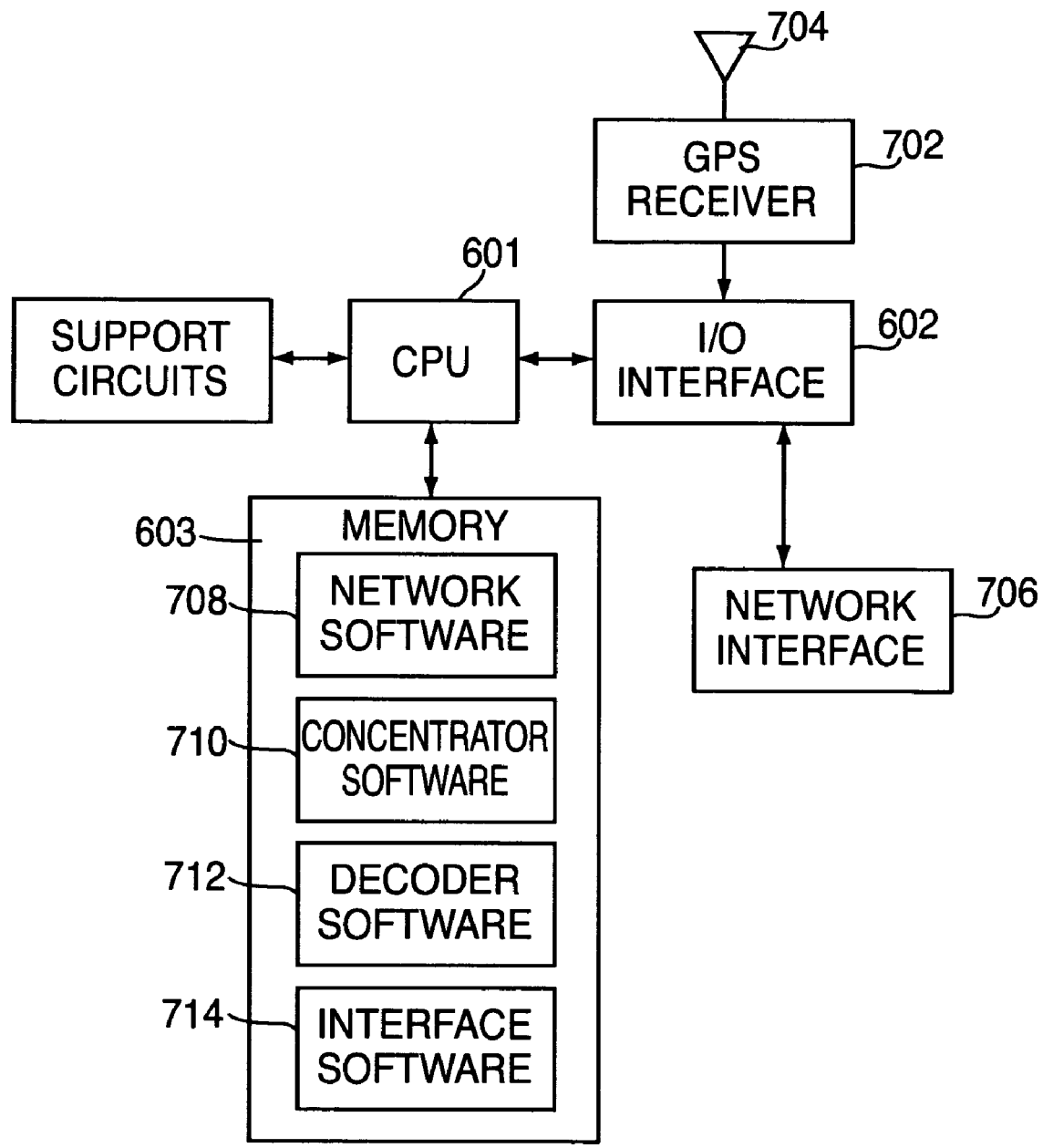
FIG. 7 is a block diagram depicting an exemplary embodiment of the computer of FIG. 6 used as a multi-function appliance in accordance with the invention.

FIG. 7 is a block diagram depicting an exemplary embodiment of the computer 600 of FIG. 6 in accordance with the invention. Elements of FIG. 6 that are the same or similar to those of FIG. 7 are designated with identical reference numerals and are described above. In the present embodiment, the computer 600 is configured with a plurality of modules that allow the computer to implement any one of the network elements of the satellite navigation data distribution system 100 of FIG. 1. For example, the computer 600 includes the functionality via the modules to implement a reference station, a hub, or a server. The modules may be software modules, hardware modules, or a combination of software and hardware.

In the example shown in FIG. 7, and with reference to FIG. 1, the computer 600 includes a GPS receiver 702 coupled to an antenna 704, a network interface 706, and network software 708. The GPS receiver 702 and the network interface 706 may be coupled to the I/O interface 602. For example, the GPS receiver 702 and the network interface 706 may be implemented using peripheral component interconnect (PCI) cards or like type bus cards known in the art. The GPS receiver 702 is configured similarly to each of the GPS receivers 104 in the reference stations 102. The network software 708 includes a packetizer configured to format a satellite navigation stream produced by the GPS receiver 702 for transmission over the network 106 to a hub 108 (e.g., the network software 708 forms IP packets for transmission using UDP). Although the packetizer is described as a software function, the packetizer may be implemented using a hardware module (e.g., a PCI card). The network interface 706 is configured to interface with the network 106 and transmit the UDP data to the hub 108. The GPS receiver 702, the network interface 706, and the network software 708 allow the computer 600 to be configured as a reference station in the satellite navigation data distribution system 100. Note that the network software 708 may include various other types of network features, such as virtual private network (VPN), firewall, and like type network features known in the art.

The computer 600 is also configured with concentrator software 710 for performing the concentration process described above. In particular, the concentrator software 710 process reference station data streams received by the network interface 706 to remove packets carrying redundant information. The concentrator software 710 produces a packet stream having unique information from all of the reference stations. The concentrated packet stream may be transmitted using the network interface 706 and the network software 708. The concentrator software 710, the network software 708, and the network interface 706 allow the computer 600 to be configured as a hub in the satellite navigation data distribution system 100. Although the concentrator is described as a software function, the concentrator may be a hardware module.

The computer 600 also includes decoder software 712 for performing the process of decoding satellite navigation data described above. In particular, the decoder software 712 extracts satellite data from a data stream that includes one or more of ephemeris, almanac, ionosphere data, UTC offset, satellite health status, and raw data bits. The extracted data may be stored in the memory 603 for distribution. The decoder software 712 allows the computer 600 to be configured as an A-GPS server in the satellite navigation distribution system 100. Note that the concentrator software 710 may also be used to implement an A-GPS server by concentrating streams received from multiple hubs and/or reference stations. Although the decoder is described as a software function, the decoder may be implemented as a hardware module.

The computer 600 may also include interface software 714 for configuring the computer 600 to perform a reference station function, a hub function, or a server function in the satellite navigation data distribution network. In this manner, the computer 600 is an appliance that can be configured by a user to perform the function of any network element in the satellite navigation data distribution system. The multi-function capability is provided by the plurality of modules located on a single platform (e.g., a computer) including, for example, a GPS receiver 702, network interfaces 706, network software 708, concentrator software 710, interface software 714 and decoder software 712, as described above. The computer 600 may include additional modules, such as network time protocol (NTP) software for time synchronization, and the like for facilitating operation of the computer 600 as a reference station, a hub, and a server. The multi-function appliance allows a network operator to procure a plurality of identical appliances, each of which is capable of functioning as any of the elements in a satellite navigation distribution system. The appliance provides flexibility in that its functionality can be changed at any time as needed.

Although the methods and apparatus of the invention have been described with reference to GPS satellites, it will be appreciated that the teachings are equally applicable to positioning systems that utilize pseudolites or a combination of satellites and pseudolites. Pseudolites are ground-based transmitters that broadcast a PN code (similar to the GPS signal) that may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

Moreover, in the preceding discussion, the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative satellite positioning systems, including the Russian Glonass system and the European Galileo system.

While the foregoing is directed to embodiments of the present invention, other and further embodiments of the invention may be devised without departing from the basic scope thereof, and the scope thereof is determined by the claims that follow.

The invention claimed is:

1. An apparatus, comprising:
a computer having an input/output (I/O) interface and a memory, the computer being configured with a plurality of modules, the plurality of modules including:
a satellite signal receiver configured to obtain satellite navigation data from satellite signals;
wherein said memory stores a plurality of instructions, said plurality of instructions further comprising:
a first plurality of instructions for packetizing the navigation data to produce reference packet streams; and
a second plurality of instructions for removing duplicate packets within reference packet streams to generate a combined packet stream; and
a network interface configured to transmit the combine packet stream over a network.

2. The apparatus of claim 1, wherein the plurality of instructions further comprises a third plurality of instructions for driving the network interface.

3. The apparatus of claim 2, wherein the third plurality of instructions includes at least one of:
an internet protocol (IP) function, a uniform datagram protocol (UDP) function, a firewall function, or a virtual private network (VPN) function.

4. The apparatus of claim 2, wherein the plurality of instructions further includes network time protocol (NTP) software for time synchronization.

5. The apparatus of claim 1, wherein the computer further includes an interface for configuring the computer to perform a reference station function, a hub function, or a server function in a satellite navigation data distribution network.

6. The apparatus of claim 1, wherein packetizing the navigation data further comprises:
placing each subframe of the ephemeris data in separate packets of the reference packet stream.

7. The apparatus of claim 6, wherein each of the separate packets of the reference stream that each subframe is placed therein further comprise:
a packet header, said packet header including identifying information identifying a satellite transmitting the subframe therein.

8. The apparatus of claim 7, wherein removing duplicate packets within the reference packet stream further comprises:
removing duplicate packets based on the identifying information in the packet header.

9. An apparatus, comprising:
a computer having an input/output (I/O) interface and a memory, the computer being configured with a plurality of modules, the plurality of modules including:
a means for obtaining satellite navigation data from satellite signals;
a means for packetizing the satellite navigation data to produce a reference packet stream;
a means for removing duplicate packets within reference packet streams to generate a combined packet stream; and
a means for transmitting the combined packet stream over a network.

10. The apparatus of claim 9, wherein the plurality of modules include hardware modules, software modules, or a combination of hardware and software modules.

11. The apparatus of claim 10, wherein the means for obtaining and the means for transmitting each comprise a hardware module coupled to the I/O interface, and wherein the means for packetizing, the means for removing, and the means for decoding each comprise a software module stored in the memory.

12. The apparatus of claim 10, wherein the plurality of modules further includes means for driving the means for transmitting.

13. The apparatus of claim 12, wherein the means for driving includes at least one of:
an internet protocol (IP) function, a uniform datagram protocol (UDP) function, a firewall function, or a virtual private network (VPN) function.

14. The apparatus of claim 10, wherein the plurality of modules further includes a means for time synchronization.

15. The apparatus of claim 9, wherein the computer further includes a means for configuring the computer to perform a reference station function, a hub function, or a server function in a satellite navigation data distribution network.

* * * * *

UNITED STATES PATENT AND TRADEMARK OFFICE
CERTIFICATE OF CORRECTION

| | | |
|---|---|---|
| PATENT NO. | : 7,640,103 B2 | Page 1 of 1 |
| APPLICATION NO. | : 11/206615 | |
| DATED | : December 29, 2009 | |
| INVENTOR(S) | : Abraham et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2 days.

Signed and Sealed this
Eleventh Day of October, 2011

David J. Kappos
*Director of the United States Patent and Trademark Office*